(12) United States Patent
Frenger et al.

(10) Patent No.: US 9,210,593 B2
(45) Date of Patent: Dec. 8, 2015

(54) SYSTEM AND APPARATUS FOR INDICATING CELL IDENTIFIERS

(71) Applicant: Telefonaktiebolaget LM Ericsson (publ), Stockholm (SE)

(72) Inventors: Pål Frenger, Linköping (SE); Fredrik Gunnarsson, Linköping (SE); Johan Moe, Mantorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 87 days.

(21) Appl. No.: 14/029,000

(22) Filed: Sep. 17, 2013

(65) Prior Publication Data
US 2014/0018073 A1    Jan. 16, 2014

Related U.S. Application Data

(63) Continuation of application No. 11/838,753, filed on Aug. 14, 2007, now Pat. No. 8,559,952.

(51) Int. Cl.
| | |
|---|---|
| *H04W 4/00* | (2009.01) |
| *H04W 36/00* | (2009.01) |
| *H04B 7/204* | (2006.01) |
| *H04B 7/216* | (2006.01) |
| *H04W 24/02* | (2009.01) |
| *H04J 11/00* | (2006.01) |
| *H04W 48/08* | (2009.01) |
| *H04W 84/04* | (2009.01) |

(52) U.S. Cl.
CPC ........... *H04W 24/02* (2013.01); *H04J 11/0093* (2013.01); *H04W 48/08* (2013.01); *H04W 84/045* (2013.01)

(58) Field of Classification Search
CPC .................... H04W 36/30; H04W 36/0083
USPC .................. 455/422.1, 436, 438, 442; 370/331–334, 319–320, 335
See application file for complete search history.

(56) References Cited

U.S. PATENT DOCUMENTS 6,061,337 A     5/2000 Light et al.
6,134,215 A  *  10/2000 Agrawal et al. ............ 370/209
(Continued)

FOREIGN PATENT DOCUMENTS

EP     1 740 002     2/2005
EP     1 657 950     5/2006
(Continued)

OTHER PUBLICATIONS

U.S. Appl. No. 11/838,753, filed Aug. 14, 2007; Inventor: Frenger et al.

(Continued)

*Primary Examiner* — Dung Hong
(74) *Attorney, Agent, or Firm* — Baker Botts, LLP

(57) ABSTRACT

The technology described relates to cell identifiers in which a cell provides two reporting cell identifiers for user equipments (UEs) taking cell measurements. In a non-limiting example embodiment, a secondary synchronization channel (S-SCH) is used to transmit two short cell identities. In this case, a cell uses two sets of signature sequences, one corresponding to the old reporting cell identifier and one corresponding to the new reporting cell identifier.

29 Claims, 7 Drawing Sheets

(56) References Cited

U.S. PATENT DOCUMENTS

| | | | |
|---|---|---|---|
| 6,195,552 B1* | 2/2001 | Jeong et al. | 455/436 |
| 6,449,482 B1 | 9/2002 | Johansson et al. | |
| 2002/0004397 A1 | 1/2002 | Lee et al. | |
| 2005/0130655 A1 | 6/2005 | Lundh et al. | |
| 2005/0148368 A1 | 7/2005 | Scheinert et al. | |
| 2006/0121907 A1 | 6/2006 | Mori et al. | |
| 2006/0166694 A1* | 7/2006 | Jeong et al. | 455/525 |
| 2006/0172707 A1* | 8/2006 | Stern-Berkowitz et al. | 455/67.11 |
| 2006/0234713 A1 | 10/2006 | Oswal et al. | |
| 2007/0097938 A1 | 5/2007 | Nylander et al. | |
| 2007/0213086 A1* | 9/2007 | Claussen et al. | 455/513 |
| 2008/0039141 A1 | 2/2008 | Claussen et al. | |
| 2008/0189970 A1* | 8/2008 | Wang et al. | 33/701 |
| 2008/0227456 A1* | 9/2008 | Huang et al. | 455/436 |

FOREIGN PATENT DOCUMENTS

| | | |
|---|---|---|
| JP | 06350595 | 12/1994 |
| WO | WO 2005/006798 | 1/2005 |
| WO | WO 2005/032190 | 4/2005 |
| WO | WO 2005/091667 A1 | 9/2005 |
| WO | WO 2008/020969 | 2/2008 |
| WO | WO 2008/104196 | 8/2008 |
| WO | WO 2008/113373 | 9/2008 |

OTHER PUBLICATIONS

Office Action mailed May 26, 2010 in U.S. Appl. No. 11/838,753.
Office Action mailed Dec. 8, 2010 in U.S. Appl. No. 11/838,753.
Office Action mailed Sep. 6, 2012 in U.S. Appl. No. 11/838,753.
Office Action mailed Feb. 5, 2013 in U.S. Application U.S. Appl. No. 11/838,753.
Office Action mailed May 26, 2010 in co-pending U.S. Appl. No. 11/838,770.
U.S. Appl. No. 11/773,752, filed Jul. 5, 2007; Inventor: Moe et al.
Office action mailed Feb. 9, 2012 in U.S. Appl. No. 11/838,770.
Office action mailed May 26, 2010 in U.S. Appl. No. 11/838,770.
Office action mailed Dec. 8, 2010 in U.S. Appl. No. 11/838,770.
Office action mailed Aug. 31, 2011 in U.S. Appl. No. 11/838,770.
European Application No. PCT/EP2007/001737 filed Feb. 28, 2007, Inventor: Moe et al.
3GPP TSG-SA5 "*Discussion on Automatic Neighbour Relation Lists for Te*," (Telecom Management) Meeting SA5#53, May 7-11, 2007, Sophia Antipolis, France, S5-070974.
3GPP TS 36.00 V8.1.0, *3$^{rd}$ Generation Partnership Project; Technical Specification Group Radio Access Network; Evolved Universal Terrestrial Radio Access (E-UTRA) and Evolved Universal Terrestrial Access Network (E-UTRAN)*; Release 8, Jun. 2007, pp. 1-106.
3GPP TS 36.300 V0.1.0 (Oct. 2006), Section 8.2, p. 32.
Breitbach et al., "*Operator Use Cases Related to self Organising Network*", T-Mobile, Aug. 1, 2007, pp. 1-55.
International Search Report and Written Opinion of the International Searching Authority mailed Dec. 23, 2008 in corresponding PCT Application PCT/SE2008/050907.
International Search Report mailed Jan. 1, 2009 in corresponding PCT Application PCT/SE2008/050903.
International Preliminary Report mailed Feb. 25, 2010 in corresponding International Application No. PCT/SE2008/050907.
European Search Report mailed Dec. 2, 2011 in corresponding EP Application No. 08 779 464.0.
Ericsson: "MCI Conflict Detection and Resolution", 3GPP Draft; S5-071569 E MCI Conflict Detection and Resolution, vol. SA WG5, No. Roma; Aug. 22, 2007, XP050306211.
English translation of Chinese office action dated May 18, 2012 in Chinese Application No. 200880102532.9.
English translation of Chinese Official Action dated Jan. 31, 2013 in Chinese Application No. 200880102742.8.
Chinese Search Report dated Jan. 31, 2013 in Chinese Application No. 200880102742.8.
English translation of Chinese Official Action dated Aug. 3, 2012 in Chinese Application No. 200880102742.8.
European office action mailed Sep. 6, 2011 in corresponding European Application No. 08 779 460.8-2412.
Ericsson, UE Measurements and Reporting of Global Cell Identity, 3GPP TSG-RAN WG2 #58bis; R2-072674, Jun. 22, 2007; XP050135465.
M. Amirijoo et al., Neighbor Cell Relation List and Measured Cell Identity Management in LTE, Network Operations and Management Symposium 2008, IEEE, Apr. 7, 2008, pp. 152-159, XP031290513.

* cited by examiner

SYSTEM AND APPARATUS FOR INDICATING CELL IDENTIFIERS

PRIORITY APPLICATION

This application is a continuation of U.S. patent application Ser. No. 11/838,753, filed on Aug. 14, 2007, the contents of which are incorporated here by reference.

TECHNICAL FIELD

The technical field relates to mobile radio communications involving mobile radio terminals and radio base stations in a mobile radio communications system.

BACKGROUND

Universal Mobile Telecommunications System (UMTS) is a 3rd Generation (3G) mobile communication system employing Wideband Code Division Multiple Access (WCDMA) technology standardized within the $3^{rd}$ Generation Partnership Project (3GPP). In the 3GPP release 99, the radio network controller (RNC) controls resources and user mobility. Resource control includes admission control, congestion control, and channel switching which corresponds to changing the data rate of a connection.

The Long Term Evolution (LTE) of UMTS is under development by the 3rd Generation Partnership Project (3GPP) which standardizes UMTS. There are many technical specifications hosted at the 3GPP website relating to Evolved Universal Terrestrial Radio Access (E-UTRA) and Evolved Universal Terrestrial Radio Access Network (E-UTRAN), e.g., 3GPP TS 36.300. The objective of the LTE standardization work is to develop a framework for the evolution of the 3GPP radio-access technology towards a high-data-rate, low-latency and packet-optimized radio-access technology. In particular, LTE aims to support services provided from the packet switched (PS)-domain. A key goal of the 3GPP LTE technology is to enable high-speed packet communications at or above about 100 Mbps.

FIG. 1 illustrates an example of an LTE type mobile communications system 10. An E-UTRAN 12 includes E-UTRAN NodeBs (eNBs) 18 that provide E-UTRA user plane and control plane protocol terminations towards the user equipment (UE) terminals 20 over a radio interface. An eNB is sometimes more generally referred to as a base station, and a UE is sometimes referred to as a mobile radio terminal or a mobile station.

Each base station transmits a signature sequence over an entire cell area for the UE terminals to detect and measure. Measurements performed by the UE terminals on the received signal strength of different base station signature sequences are used in most radio communication systems (e.g. GSM, WCDMA, LTE, WCDMA-2000 etc.) to perform, e.g., initial cell selection and handover decisions. A signature sequence in WCDMA includes a particular scrambling code that is applied to the common pilot channel transmitted from each NodeB. The WCDMA standard specifies 512 unique scrambling codes with 512 corresponding MCIs. In LTE, a signature sequence is two-dimensional and is generated as a symbol-by-symbol product of a two-dimensional orthogonal sequence and a two-dimensional pseudo-random sequence. In total, the LTE standard defines 510 such unique signature sequences with 510 corresponding MCIs. In LTE, UEs measure the signature sequence for neighboring cells to determine a reference symbol received power (RSRP), and these RSRP measurements are used when performing initial cell selection for UEs to "camp" on as well as when performing handovers of UE connections.

Ideally, the signature sequences that a single UE can detect are uniquely mapped to a particular base station. But in most radio communication systems, the number of unique signature sequences that a particular standard specifies is less than the number of base stations in the system. The number of signature sequences is limited because transmission of a signature sequence is associated with a radio resource cost, i.e., power, bandwidth, code space, frequency space, or time, and that cost increases with the number of unique signature sequences for which the system is designed. Another reason why the number of signature sequences is limited relates to the UE mobile stations frequently reporting measurements related to the different signature sequences back to the radio network, e.g., to the serving base station. A UE may report several such measurements several times per second, and therefore, it is desirable that such measurement reports can be encoded with fewer bits to reduce the impact of those reports on the limited radio bandwidth.

In light of these considerations, a one-to-one mapping may be established between a signature sequence transmitted by the base station and a measurement cell identity (MCI) used by the UEs in the encoded measurement reports. The term MCI is used here as a convenient way of specifying which particular signature sequence a given base station is transmitting. An MCI may be viewed as an index that permits the UE to determine the corresponding signature sequence.

UEs continuously monitor system information as well as the signature sequences broadcasted by base stations within range to inform themselves about "candidate" base stations in the service area. When a UE needs access to services from a radio access network, it sends a request over a random access channel (RACH) to a suitable base station, typically a base station with the most favorable radio conditions. As shown in FIG. 1, the base stations are interconnected with each other by means of an X2 interface. The base stations are also connected by an S1 interface to an Evolved Packet Core (EPC) 14 which includes a Mobility Management Entity (MME) by an S1-MME and to a System Architecture Evolution (SAE) Gateway by an S1-U. The MME/SAE Gateway is as a single node 22 in this example. The S1 interface supports a many-to-many relation between MMEs/SAE Gateways and eNBs. The E-UTRAN 12 and EPC 14 together form a Public Land Mobile Network (PLMN). The MMEs/SAE Gateways 22 are connected to directly or indirectly to the Internet 16 and to other networks.

One important focus area in LTE/SAE standardization work is to ensure that the evolved network is simple to deploy and cost efficient to operate. The vision is that the evolved network will be self-optimizing and self-configuring in as many aspects as possible. A self-configuration process is one where newly-deployed nodes are configured by automatic installation procedures to get the necessary basic configuration for system operation. A newly-deployed base station typically contacts a central server (or several such servers) in the network and obtains configuration parameters needed in order to start operating. Self-optimization is a process where UE and base station measurements and performance measurements are used to automatically "tune" the network. One example is automating neighbor cell lists, and one non-limiting way of automatically building neighbor cell lists is described in commonly-assigned, U.S. patent application Ser. No. 11/538,077, filed on Oct. 3, 2006, and published as US 2007/0097938, the contents of which are incorporated herein by reference. In GSM and WCDMA, base stations send neighbor cell lists to connected UEs so they have a defined set of cell broadcasts to measure (e.g., signal quality or strength) to permit determination of which if any neighbor cells is a suitable candidate for handover. In an LTE system, neighbor cell relation (NCR) lists are also used in the eNBs to set up connections over the X2 and/or S1 interfaces.

An area potentially advantageous for self-configuring is automatic assignment of shorter measurement cell identities (MCIs) to base stations. Shorter cell identifiers like an MCI used in the UE measurement reports frequently transmitted to the network reduce the amount of radio resources consumed. The shorter cell identifiers are therefore sometimes referred to here as reporting cell identifiers. In addition to the short MCI, each cell is associated with a longer cell identity that uniquely identifies the cell within the public land mobile radio network (PLMN) to which the cell belongs. A non-limiting example of such a longer identifier is a cell identity on the PLMN level (CIPL).

With a limited number of MCIs or other reporting cell identifiers, some MCIs are likely to be reused in larger networks, which means network planning is needed. Today, such planning is typically done manually. For example, when planning in an LTE RAN, each cell in the network is assigned an MCI, and the planner tries to distribute the MCIs so that neighboring cells do not have the same MCI. But such attempts may not always be successful. This is true even if this operation is to be performed automatically using a suitable allocation algorithm implemented on a computer. An automatic MCI allocation algorithm should preferably also be capable of assigning MCIs in difficult networks deployments, e.g., networks with a large number of home base stations over which the network operator has little control.

A home base station is a small radio base station, also called a "Femto base station," "pico base station," or "micro base station" in some contexts. In LTE, a home eNB is smaller than a pico eNB, and a pico eNB is smaller than a macro eNB. The coverage area for a home cell is relatively small (a pico or micro cell) as compared to a cell covered by a standard macro radio base station. Home base stations are likely installed by the end user rather than by the network operator. The end users are also able to move the home base stations geographically from place to place without the operator being able to control relocation of the home base station. This lack of operator control and significant volume of base stations presents challenges with respect to conflicting short cell identifiers.

In order to perform a handover in LTE from a source cell to a target cell, the two involved cells must first set up a neighbor cell relation (NCR). The NCR contains at least the MCI (or other short cell identifier) and the CIPL (or other longer cell identifier). The NCR may also include connectivity information such as the IP address of the corresponding cell, information about the configurations of the X2 and S1 interfaces, and parameters needed for different radio resource management control algorithms, such as handover thresholds. Information about the radio access technology (RAT) (e.g., LTE, WCDMA, or GSM) as well as other capabilities of the target cell may also be included in the NCR.

Building the NCR list in each base station can be done automatically. Each time a new base station is deployed, it contacts a central server in the network and that server assigns the base station with a CIPL and an IP address. The base station begins operation with an empty NCR list, and each time it receives a measurement report from a served UE that contains a MCI that is not included in the NCR, the base station asks the UE to obtain the CIPL of that corresponding (non-serving) base station. In LTE, the CIPL is broadcasted (infrequently) on the broadcast channel (BCH) which allows the UE to detect the corresponding CIPL of the non-serving base station and report it back to the serving base station. The serving base station can then contact the central server to obtain the remaining NCR information corresponding to that non-serving base station.

When a base station has two neighbors with different CIPLs but with the same MCI, there is an MCI "collision" or conflict. Assuming the collision is resolved, one or more cells must change its old colliding MCI to a non-colliding MCI. To make this change requires closing down the cell, reconfiguring the new MCI value, and then restarting the cell. Alternatively, the cell may just change the MCI without closing and restarting, which means that all the UEs currently "camped" on that cell loose synchronization disturbing all active UE communications in that cell. Those disturbed UEs must perform new cell searches likely resulting in at least most of them selecting that same cell and performing a random access attempt. Such a mass random access is problematic because the typical random access channel is not designed to handle a large number of simultaneous access attempts. Alternatively, those UEs could select another, less satisfactory cell.

Another problem with such MCI collisions is that all neighboring cells to the cell with the new MCI no longer have correct and current information in their respective neighbor cell relation (NCR) lists. Consequently, when those neighboring cells receive measurement reports from the UEs using the new MCI, the neighboring cells must then re-establish their relationship to the cell with the new MCI. Until then, the neighboring cells can not order any UEs to perform a handover to that cell, which could result in dropping those calls that need handover being dropped.

MCI collisions will cause significant problems when new home or other base stations are set up without any coordination in a densely populated area (e.g., Manhattan). Each time a consumer sets up a home base station or moves the location of that home base station, there is a high likelihood of many MCI collisions because the network operator is not in control of that base station set up or movement and therefore can not do the cell planning/coordination needed to avoid MCI collisions. During the "roll-out" phase of a new network, new cells will be added, and MCI collisions are also likely to occur as a result. "Relay" base stations may also be installed in moving vehicles like cars, buses, and trains. Because these base stations move around, frequent MCI collisions may be experienced. Also, other autonomous changes in a self-organizing network, like adjustments in power levels or in antenna tilt, may cause MCI collisions to occur.

Thus, it would be advantageous to be able change cell identifiers, like MCIs, in a seamless, automated, and coordinated fashion.

SUMMARY

A need is detected to change a cell identifier associated with a cell in a cellular radio communications network from a first cell identifier to a second cell identifier. A cell identifier change message including the second cell identifier is sent to one or more radio transceiver nodes. The cell identifier is changed from the first cell identifier to the second cell identifier without having to disrupt ongoing communications with user equipment (UE) terminals in that cell. The cell identifier change message may include a time parameter from which the one or more radio transceiver nodes can determine when to change the cell identifier for the cell from the first cell identifier to the second cell identifier.

In one non-limiting example embodiment, the one or more radio transceiver nodes include UE terminals being served in the cell. In another non-limiting example embodiment, the one or more radio transceiver nodes include neighboring base stations. Other additional features include the option of instructing UE terminals being served in the cell to perform a handover to the second cell identifier or having the UE terminals use the first and the second cell identifiers during the cell identifier change process.

The first and second cell identifiers can be reporting cell identifiers used by the UE terminals to identify cells associated with a reporting parameter provided by the UE terminals in measurement reports sent by the UE terminals to the cellular radio communications network. In this case, the reporting cell identifiers are not necessarily unique within the network. A neighbor cell list associated with the cell may be updated using the measurement reports received from the UE terminals. The neighbor cell list includes for each neighbor cell its reporting cell identifier, which has a first relatively short length, another cell identifier, which has a first relatively long length, and one or more associated parameter(s).

For one example, the cellular radio communications network is a long term evolution (LTE) network and the first and second cell identifiers are measuring cell identifiers (MCIs) used by the UE terminals to identify cells associated with a measurement parameter detected by the UE terminals in measurement reports sent by the UE terminals to the LTE network. The neighbor cell relation list associated with the cell is updated using the measurement reports received from the UE terminals, and the neighbor cell relation list includes for each neighbor cell its shorter MCI, a longer cell identity for a public land mobile network (PLMN) level (CIPL), and one or more associated parameter(s).

The technology described here allows a cell to automatically (without human intervention) change a reporting cell identity (of which an MCI is one non-limiting example) seamlessly, i.e., without disrupting ongoing UE communications in that cell. Furthermore, the technology enables plug-and-play operations in radio network deployments with a large number of home base stations and/or a large number of relay nodes. It also enables the use of moving base stations and relay stations (e.g., in different kinds of vehicles) as well as other adaptive techniques that change the size of a cell dynamically (e.g., automatic power settings, advanced antenna beam forming and/or automatic antenna tilting).

In another example embodiment, a radio transceiver, served by a base station supporting a cell in a cellular radio communications network, receives a first signal transmitted by the serving base station, where the first signal indicates a first cell identifier for identifying the cell. The transceiver performs measurement on the first signal to generate a first measurement signal, transmits the first measurement signal to the serving base station, and receives a cell identifier message indicating a second cell identifier from the serving base station for identifying the cell. Thereafter, the transceiver receives from the base station both the first signal indicating the first cell identifier and a second signal indicating the second cell identifier, performs measurement on the second signal to generate a second measurement signal, and transmits the second measurement signal to the serving base station.

There are different example implementations. One is the first signal and the second signal can be sent on the same channel, an example of which is a secondary synchronization channel. Another is associating the cell with two different reference sequences, one corresponding to the first cell identifier and the other corresponding to the second cell identifier. Yet another is having the cell identifier message also indicate a time parameter from which one or more radio transceiver nodes can determine when to stop performing measurements on the first signal indicating the first cell identifier but continue performing measurements on the second signal indicating the second cell identifier.

In another example embodiment, a base station supporting a cell in a cellular radio communications network and serving radio transceivers associated with the cell transmits a first signal that indicates a first cell identifier for identifying the cell. The base station receives from one of the radio transceivers a first measurement signal indicating a measurement associated with the first signal that indicates the first cell identifier and transmits a cell identifier message indicating a second cell identifier for identifying the cell. Thereafter, the base station transmits both the first signal indicating the first cell identifier and a second signal indicating the second cell identifier and receives from the one radio transceiver a second measurement signal indicating a measurement associated with the second signal that indicates the second cell identifier.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail.

It will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be embodied in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to a general or special purpose computer capable of executing software code, and may include, without limitation, digital signal processor (DSP) hardware, application specific integrated circuit hardware (ASIC), read only memory (ROM) for storing software, random access memory (RAM), and non-volatile storage.

It will be apparent to one skilled in the art that other embodiments may be practiced apart from the specific details disclosed below. All statements reciting principles, aspects, and embodiments, as well as specific examples, are intended to encompass both structural and functional equivalents. Such equivalents include both currently known equivalents as well as equivalents developed in the future, i.e., any elements developed that perform the same function, regardless of structure.

Figure 1:
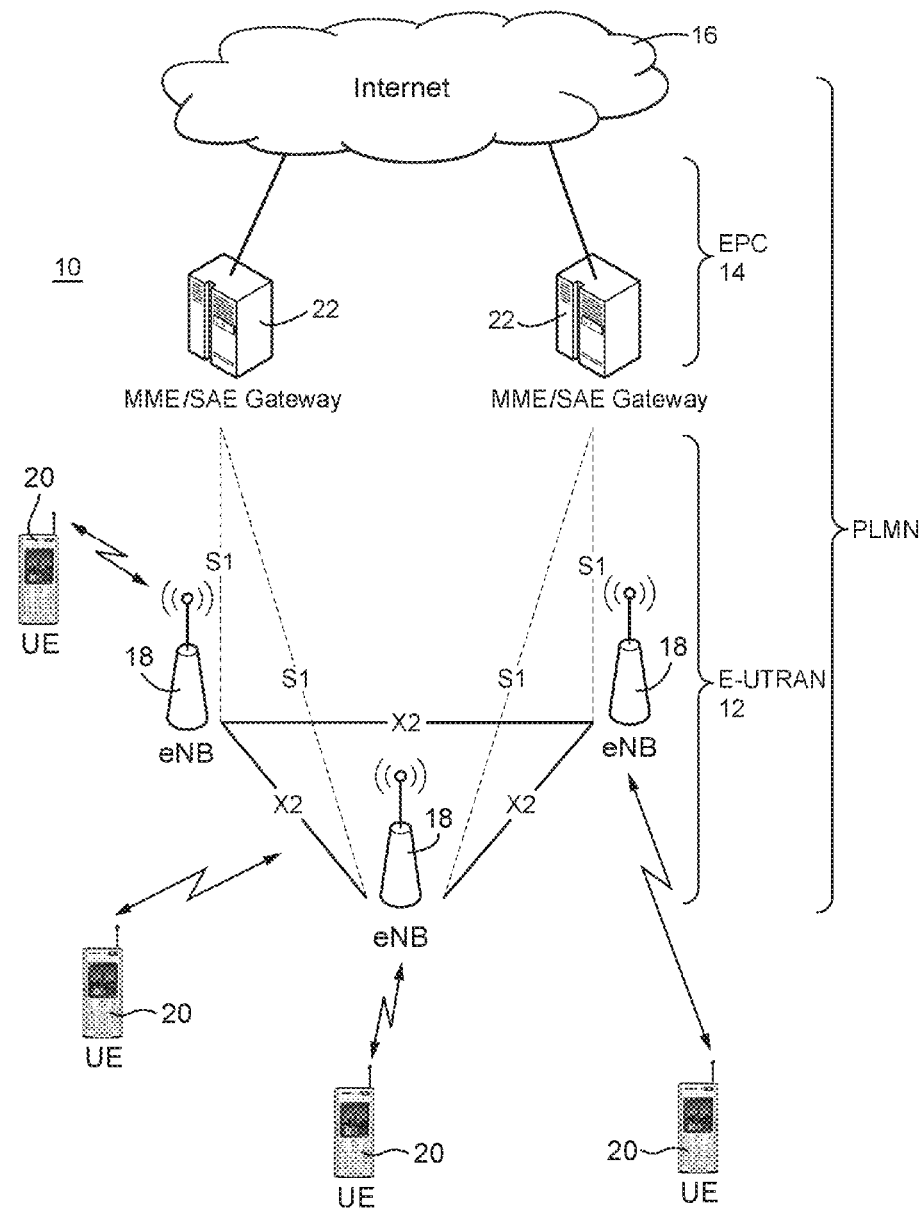
FIG. 1 a block diagram of an example LTE mobile radio communications system.
Figure 2:
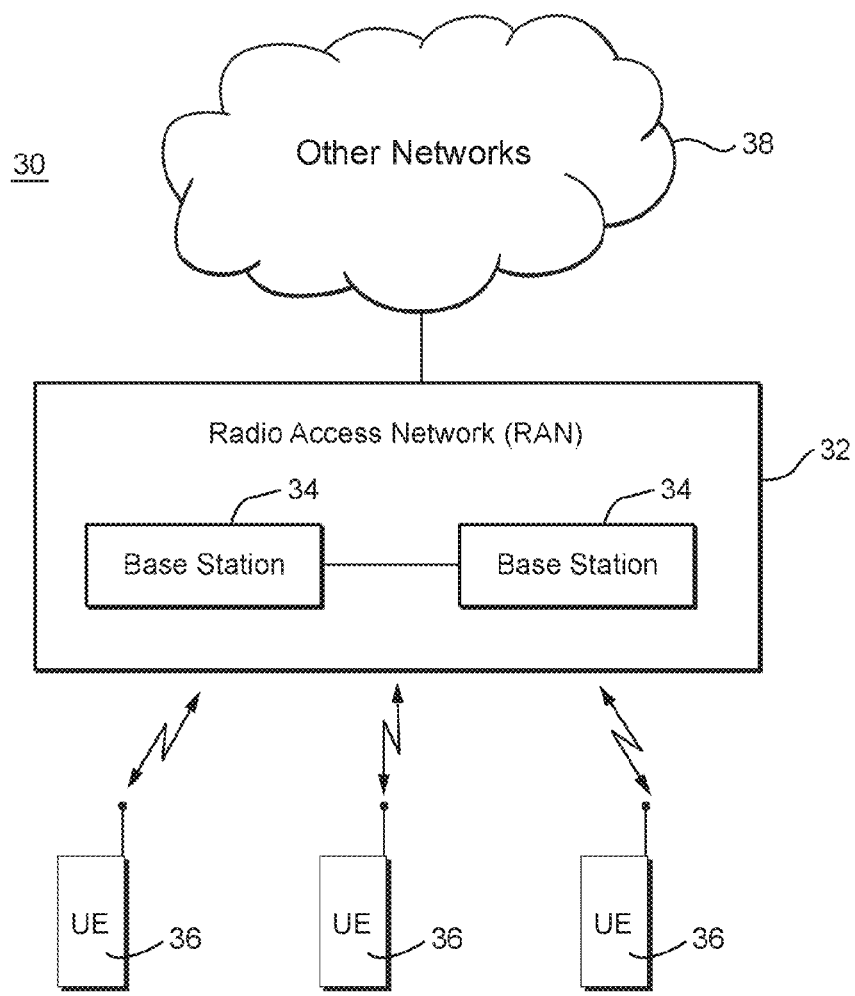
FIG. 2 a block diagram of an example more general RAN mobile radio communications system.

The technology is described in the context of an evolved 3GPP UMTS system, such as LTE, in order to provide an example and non-limiting context for explanation. But this technology may be used in any modern cellular communications system that supports cell identification. One non-limiting example of a general cellular communications system 30 is shown FIG. 2. A radio access network (RAN) 32 is coupled to one or more other networks 38 such as one or more core network nodes and one or more external networks such as the public switched telephone network (PSTN) and the Internet. The RAN 32 includes base stations 34 that communicate with each other, e.g., for handover and other coordinated functions. The base stations communicate over the radio/air interface with mobile radio terminals also referred to as user equipment terminals (UEs) 36. Although an MCI is used in the LTE context as an example of a cell identifier, the technology described here may be applied to any cell identifier.

Figure 3:
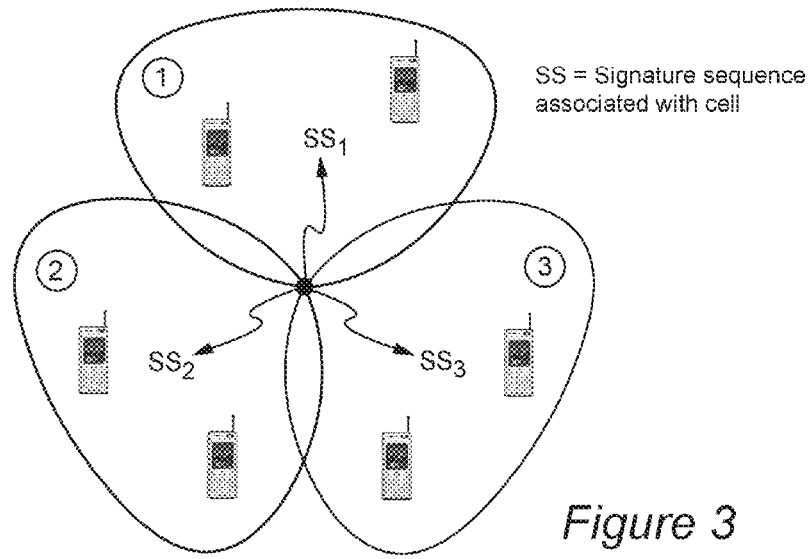
FIG. 3 is a diagram illustrating an example base station serving multiple cells and broadcasting a corresponding cell signature sequence in each cell area.

As described above, each base station broadcasts a predetermined "signature sequence" or other identifier over a known frequency that may be detected by UEs scanning for such base station broadcasts in a cell area associated with the broadcast. The term "cell" refers to the geographical area where an associated base station or eNB provides UEs radio service. But a cell is also sometimes used as a shorthand way of referring to the base station or eNB associated with that cell. Each signature sequence, which is detectable by UEs, is mapped to a relatively short cell identifier that is used by the UEs when sending back frequent measurement reports to a serving cell. FIG. 3 shows an example base station serving three cells 1-3. Each cell transmits its own signature sequence. Other base stations may only have one cell or a different number of cells. Regardless, each cell's own signature sequence is mapped to a corresponding, relatively short cell identifier. It is these shorter, reporting or measurement cell identifiers that are subject to collisions. A longer, more unique cell identifier may also be mapped to the short cell identifier/cell signature sequence.

Figure 4:
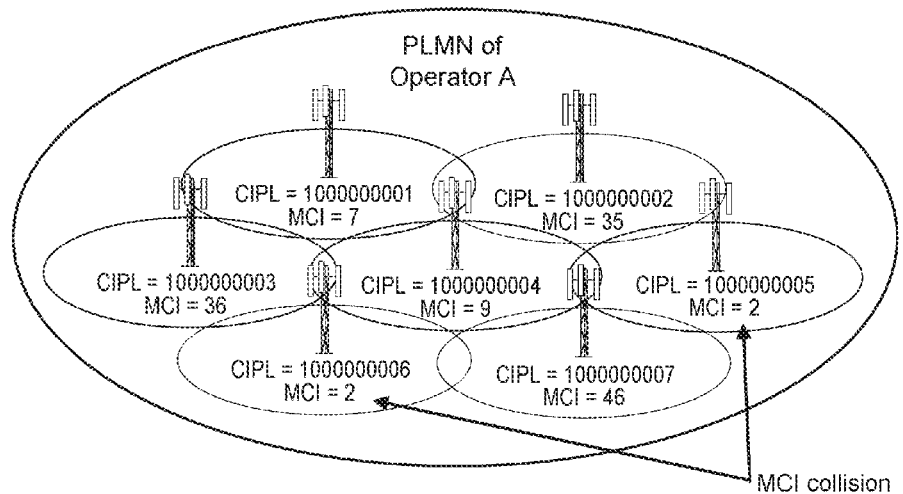
FIG. 4 is a diagram illustrating an example of a PLMN for an operator A in which each cell includes a shorter length MCI cell identifier and a longer CIPL cell identifier.

FIG. 4 illustrates an LTE example of a reporting or measurement cell identifier collision. The figure shows a PLNM of a network operator A where all cells have unique but relatively long identifiers denoted CIPLs within the PLMN. Each cell has an associated base station, or using LTE-specific terminology, an associated eNB. As in FIG. 3, two or more cells may be associated with the same base station. In addition to a corresponding and relatively long CIPL, each cell also has a shorter length cell identifier, i.e., the MCI, sent in frequent measurement reports by UEs to their respective serving cells. In other words, the reporting or measurement cell identifier is associated with a particular measurement or other parameter for a particular cell, e.g., a neighboring cell. The MCI is not unique within the PLMN, and therefore, the MCI values must be reused. In this LTE example, an MCI=2 is used both in the cell with a CIPL=1000000006 and in the cell with a CIPL=1000000005. Even though these two cells are not direct neighbors to each other, this duplicate use of the same MCI causes problems. For example, an MCI collision occurs when the cell with CIPL=1000000007 is not able to map UE measurement reports related to an MCI=2 to one unique neighboring cell identity because those UE reports identify an MCI=2 for two different cells.

Figure 5:
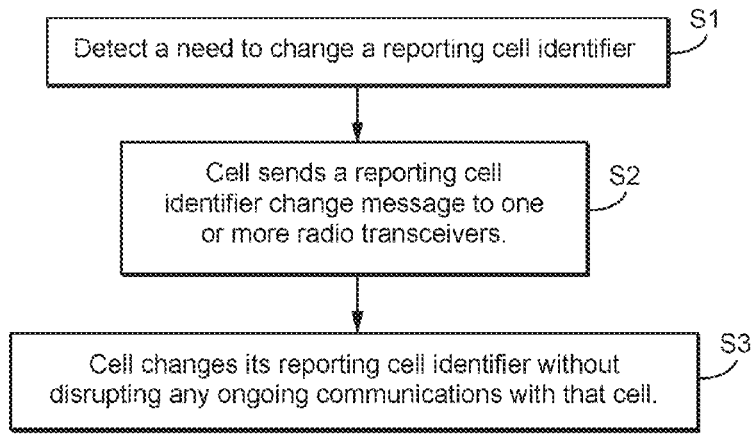
FIG. 5 is a flowchart diagram illustrating non-limiting, example procedures for automatically and seamlessly changing a cell identifier.
Figure 6:
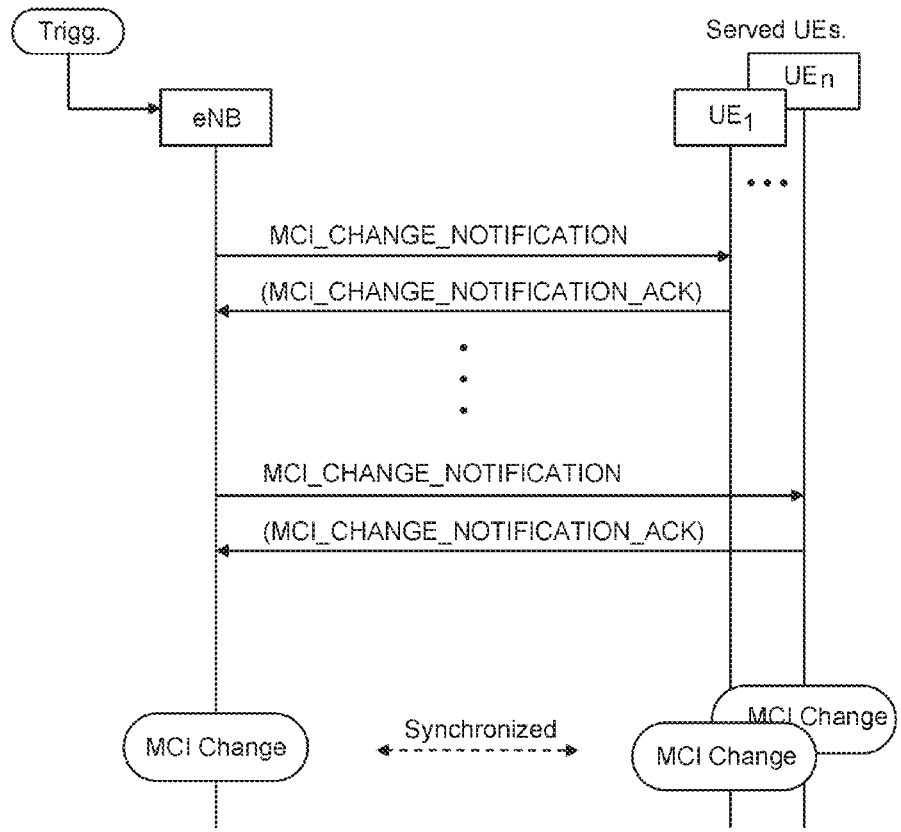
FIG. 6 is a signaling diagram illustrating non-limiting, example signaling messages for automatically and seamlessly changing a cell identifier in accordance with a first non-limiting, example embodiment.

When a cell changes its reporting cell identifier (a general term adopted here of which an MCI is one non-limiting example) from an old reporting cell identifier to a new reporting cell identifier, e.g., as a result of a reporting cell identifier collision, it is desirable that UEs currently camping on that cell be able to continue to communicate without disruption. The flowchart in FIG. 5 provides non-limiting example procedures for accomplishing that seamless reporting cell identifier change. The cell detects a need to change a reporting cell identifier (step S1). It sends a reporting cell identifier change message to one or more radio transceivers that are or are likely to be affected by this reporting cell identifier change (step S2). The cell then changes at a designated time its reporting cell identifier without disrupting any ongoing communications with that cell (step S3).

In one non-limiting example embodiment, the cell base station sends out a reporting cell identifier change notification message to UEs being served by that cell. The message can be sent individually over an appropriate control channel, or more efficiently, by transmitting the reporting cell identifier change notification message on a scheduled downlink shared channel using group scheduling that targets several UEs at the same time. The reporting cell identifier change notification message includes a new reporting cell identifier and preferably a time indicator, like a count-down time value or an absolute time value, e.g., expressed as a future frame number, that informs the UEs or allows them to determine when the reporting cell identifier change will be executed. The change message is preferably transmitted long enough to ensure that UEs in low duty-cycle discontinuous transceiving modes can detect the message.

FIG. 5 shows a non-limiting and example signaling diagram for implementing this first example embodiment in an LTE context where the reporting cell identifier is an MCI. After receiving a triggering event or signal that indicates that the reporting cell identifier needs to be changed from and old identifier to a new one, the cell base station sends out an MCI_CHANGE_NOTIFICATION message to all or some of the served UEs. The message contains (at least) the new MCI and possibly also timing information about when the new MCI will be put into use. Each of those UEs then preferably responds with an MCI_CHANGE_NOTIFICATION_ACK message to acknowledge receipt of the MCI_CHANGE_NOTIFICATION message. The MCI_CHANGE_NOTIFICATION_ACK message is optional but is useful for recovering from errors. Without the acknowledgement from the UE, the base station can not be sure that the UE detected the MCI_CHANGE_NOTIFICATION message correctly. If the base station does not receive the acknowledgement from the UE, it may try to re-transmit the MCI_CHANGE_NOTIFICATION message. The cell may send out dedicated MCI_CHANGE_NOTIFICATION messages to all UEs that are camping in the cell. Such messages may contain an absolute future time reference or a count-down time value so that the UEs synchronize the change at the same time or approximately at the same time that the cell changes its MCI.

If many UEs are camping on the cell, many such messages are required, and this may take some time. Accordingly, the cell base station may send out dedicated MCI_CHANGE_NOTIFICATION messages only to active UEs and/or only to UEs that have been most recently active. This prioritizes servicing actively communicating UEs, although some lower priority, non-active UEs may loose synchronization or connection to the cell. The non-active UEs that lose connection with the cell must perform a new cell search and will probably choose to camp on the same cell as before the MCI change. In some instances, it may take some time before all disconnected, non-active UEs are re-connected to the cell because there may be collisions on the cell's random access channel (RACH) when all UEs try to connect to that cell at the same time. However, since these UEs were not actively communicating at the time when the MCI was changed, this is usually not a problem.

The UEs need to know the signature sequence of the served base station in order to detect transmissions from that base station. If the signature sequence is a scrambling code (as in WCDMA), then the UE needs to de-scramble the received signal with the correct scrambling code or else the received signal appears as noise to the UE. If the signature sequence is a pseudo-random two dimensional pilot sequence (as in LTE), then the UE needs to be able to correctly locate the pilot symbols in the time-frequency grid in order to use them in the demodulator. Without the proper MCI and the corresponding signature sequence the UE will not be able to detect the base station transmission. When the indicated MCI change time occurs, each notified UE updates its signal detector with the new signature sequence corresponding to the new the MCI so that the UE can continue to receive and detect transmissions from that base station without disruption.

In order to support legacy UEs that may not be capable of receiving a reporting cell identifier change command, the cell may send a handover command to all active UEs to perform a handover to a cell with a given reporting cell identifier, i.e., that cell's new reporting cell identifier. After transmitting the handover command(s), the cell immediately switches to the new reporting cell identifier and accepts the handover requests from those same UEs.

In an alternative, non-limiting, example embodiment, a cell may use two reporting cell identifiers during the time it takes to change from the old reporting cell identifier to the new reporting cell identifier. After all "camped" and active UEs move over to and are measuring on the cell's signature sequence broadcast corresponding to the new reporting cell identifier, the old reporting cell identifier(s) and signature sequence may be removed. The removal of the old reporting cell identifier(s) and corresponding signature sequence may be gradual so that the power of the signature sequence corresponding to the old reporting cell identifier is gradually reduced. One way to apply this non-limiting alternative in an LTE context is to use the secondary synchronization channel (S-SCH) to transmit two short cell identities. The cell uses two sets of signature sequences, one corresponding to the old reporting cell identifier and one corresponding to the new reporting cell identifier.

A second, non-limiting, example embodiment relates to neighboring cell relationships. During a change of reporting cell identifier, the cell may receive one or more handover requests from a neighbor cell. Because the neighbor base station does not have information about the new reporting cell identifier, the handover request must be rejected. Otherwise, the UE tries to attach to the cell assuming an incorrect reporting cell identifier, and as a result, the handover fails.

Figure 7:
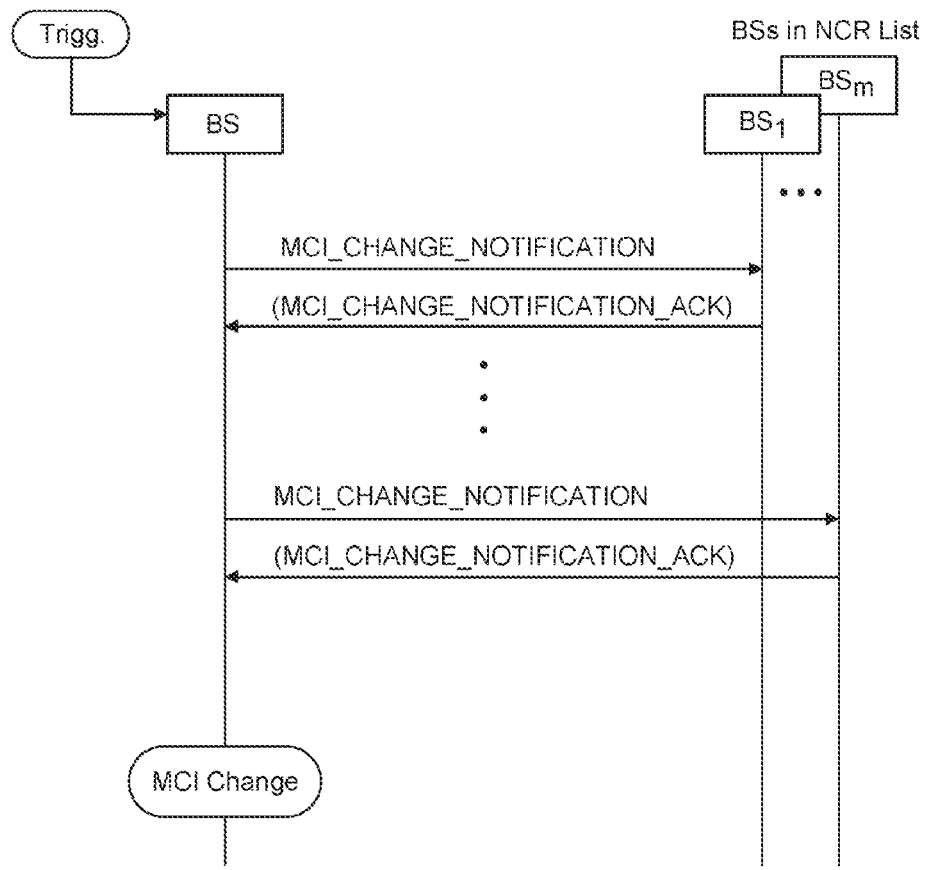
FIG. 7 is a signaling diagram illustrating non-limiting, example signaling messages for automatically and seamlessly changing a cell identifier in accordance with a second non-limiting, example embodiment.

FIG. 7 is a signaling diagram that shows one non-limiting example for automatically and seamlessly changing a cell identifier in LTE context where the reporting cell identifier is an MCI. After receiving a triggering event or signal indicating that the MCI should be changed from an old MCI to a new MCI, the cell base station sends out an MCI_CHANGE_NOTIFICATION message to all or some of the cells or base stations in that cell's neighbor cell relations (NCR) list. The message contains (at least) the new MCI and possibly also information about when the new MCI will be put into use. Each of those NCR base stations then preferably responds with an MCI_CHANGE_NOTIFICATION_ACK message to acknowledge receipt of the MCI_CHANGE_NOTIFICATION message. The acknowledgement message is not necessary but useful for the reasons explained above. Such messages may contain an absolute future time reference or a count-down time value so the NCR base stations change at the same time or approximately at the same time. The MCI change notification message may be sent over the X2 or the S1 interface to a neighboring base station.

When a base station has a new signature sequence, it also affects both the UE mobile stations served by that base station as well as other UE mobile stations currently performing handover measurements on that base station. The UE mobile stations in neighboring cells that are monitoring the old signature sequence discover that the old signature sequence (no longer being transmitted) does not correspond to a base station that might become a handover candidate. If the UE mobile stations continuously search over all possible signature sequences for potential handover candidates, then they will eventually discover the new signature sequence that the neighboring base station is currently using. During this search time, there is a risk that a UE mobile station may loose contact with the network. To prevent this from happening, a base station that receives a MCI_CHANGE_NOTIFICATION message from a neighboring base station may forward MCI change information to all or some of the UE mobile stations it serves. As a result, when the signature sequence of a neighboring cell handover candidate changes, the affected UE mobile station can switch to monitoring the new signature sequence instead of the old one.

Another problem related to a cell changing its MCI without notifying neighbor cells is that those neighbor cells will have incorrect information about the cell in their neighbor cell relation (NCR) lists. As a result, the neighboring cells will start to receive measurement reports from the UEs on the new set of reference symbols corresponding to the new MCI. But that new MCI will not be listed in their NCR list. The neighboring base stations will then order the reporting UE to read the CIPL on the cell with the new MCI. The CIPL is infrequently transmitted on the broadcast channel (BCH), which the UE then decodes and reports back to the serving base station.

The serving base station may follow two different options. When a new MCI is detected, it contacts a server in the network that can provide information about any base station if the CIPL is known. Then, it sets up a new neighbor relation to the cell. This approach has some drawbacks. The old relation is not removed from the NCR list, and eventually the NCR list may include many irrelevant entries. Potentially more significant is the fact that many base stations are likely to contact the same network server at the same time, which may overload the server.

Another preferred approach in this situation is to check all entries in the NCR list to see if the CIPL is already listed. If so, then the base station understands that the cell with the corresponding CIPL now has changed to the new MCI, and the NCL list is updated accordingly. The base station may send a message to the cell that changed MCI to confirm this, but such a confirmatory message may overload that cell if several base stations do the same thing at the same time.

Figure 8:
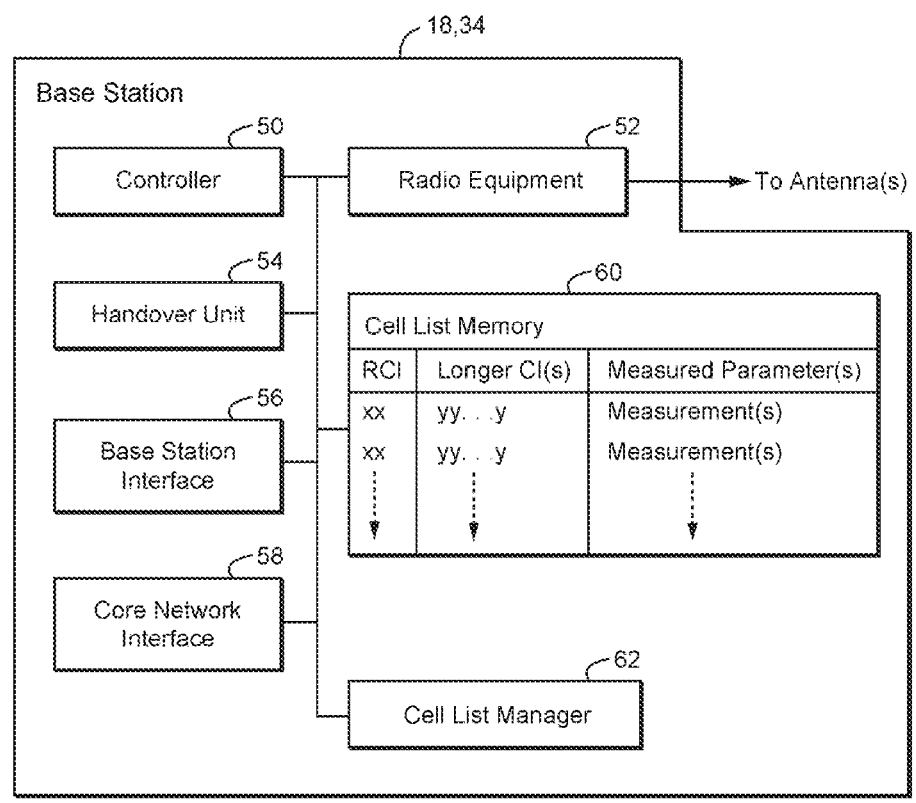
FIG. 8 is a function block diagram illustrating a non-limiting, example base station.
Figure 9:
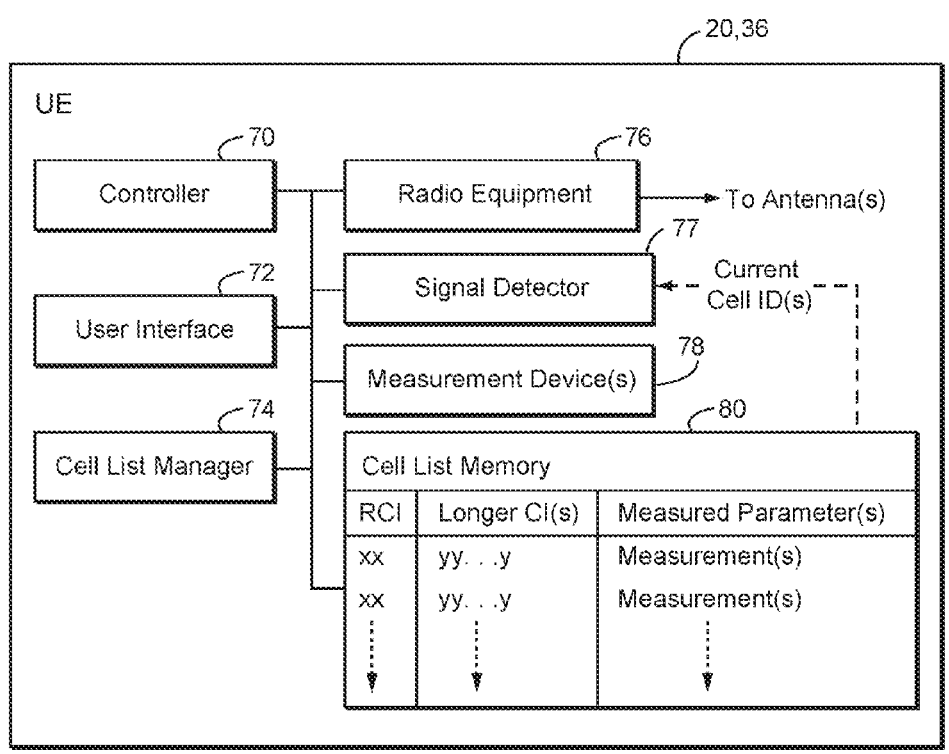
FIG. 9 is a function block diagram illustrating a non-limiting, example UE terminal.

FIGS. 8 and 9 are function block diagrams of a non-limiting example base station and UE terminal, respectively, that may be used to implement one or more aspects of this technology. The base station 18, 34 in FIG. 8 includes a controller 50, radio equipment 52 coupled to typically multiple antennas, a handover control unit 54, a base station communications interface 56, a core network communications interface 58, a cell list memory 60, and a cell list manager 62. The controller 60 supervises the overall operation of the base station, and the other blocks perform their associated base station functions. The cell list manager 62 builds and updates a neighboring cell list for this base station, e.g., an NCR list. The cell list memory 60 provides a mapping between a cell's relatively short, reporting cell identifier (RCI), e.g., an MCI, the cell's longer cell identifier, e.g., a CIPL, and other parameters associated with that neighboring cell. Non-limiting examples of such parameters include capabilities of the neighboring cell, connectivity information such as IP address and X1/S1 interface configurations, parameters related to handover (e.g., threshold values, filter parameters, timer values), performance measurement data (e.g. number of successful handovers and total number of handover attempts), or other measurements provided by UEs sending measurement reports to the base station (e.g. downlink signal strength or quality).

The UE terminal 20, 36 in FIG. 9 includes a controller 70, radio equipment 76 coupled to one or more antennas, a signal detector 77, a user interface 72, one or more measurement devices 78 (e.g., signal strength or signal quality detector), a cell list memory 80, and a cell list manager 74. The controller 70 supervises the overall operation of the UE terminal, and the other blocks perform their associated UE terminal functions. The cell list manager 74 builds and updates the UE terminal's neighboring cell list in memory 80. The cell list memory 80 provides a mapping between a cell's relatively short, reporting cell identifier (RCI), e.g., an MCI, the cell's longer cell identifier, e.g., a CIPL, and one or more measured parameters associated with that neighboring cell detected, measured, or otherwise provided by UEs sending measurement reports to the base station, e.g., downlink signal strength or quality, etc. In other implementations, the UE's NCR list might not be stored in the UE but instead in the network. The signal detector 77 receives current cell identifier information (shown conceptually with a dashed line) to permit detection of the information transmitted from the associated base station based on that current cell identifier information.

Although various embodiments have been shown and described in detail, the claims are not limited to any particular embodiment or example. Although the above description is based on the technology being implemented in base station and UE terminal, at least some of the reporting cell identifier technology in the network may be implemented in other network nodes if appropriate such as a radio network controller or even a core network node rather than the base station. Alternatively, the technology could be implemented using some combination of network nodes, e.g., divided between a base station and a radio network controller.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a radio transceiver served by a base station supporting a cell in a cellular radio communications network, comprising:
   receiving a first signal transmitted by the serving base station, where the first signal indicates a first cell identifier for identifying the cell;
   performing measurement on the first signal to generate a first measurement signal;
   transmitting the first measurement signal to the serving base station;
   receiving a cell identifier message indicating a second cell identifier from the serving base station for identifying the cell;
   thereafter, receiving from the base station both the first signal indicating the first cell identifier and a second signal indicating the second cell identifier;
   performing measurement on the second signal to generate a second measurement signal; and
   transmitting the second measurement signal to the serving base station.

2. The method in claim 1, wherein the first signal and the second signal are sent on the same channel.

3. The method in claim 2, wherein the same channel is a secondary synchronization channel.

4. The method in claim 1, wherein the cell is associated with two different reference sequences, one corresponding to the first cell identifier and the other corresponding to the second cell identifier.

5. The method in claim 1, wherein the cell identifier message indicates a time parameter from which one or more radio transceiver nodes can determine when to stop performing measurements on the first signal indicating the first cell identifier but continue performing measurements on the second signal indicating the second cell identifier.

6. The method in claim 1, further comprising:
   receiving an instruction from the base station to perform a handover to the second cell identifier.

7. The method in claim 1, wherein the first and second cell identifiers are not necessarily unique within the cellular radio communications network.

8. Apparatus implemented in a radio transceiver served by a base station supporting a cell in a cellular radio communications network, comprising:
   a radio receiver configured to receive a first signal transmitted by the serving base station, where the first signal indicates a first cell identifier for identifying the cell;
   circuitry configured to perform measurement on the first signal to generate a first measurement signal;

a radio transmitter configured to transmit the first measurement signal to the serving base station, the receiver configured to:
receive a cell identifier message indicating a second cell identifier from the serving base station for identifying the cell; and
thereafter, receive from the base station both the first signal indicating the first cell identifier and a second signal indicating the second cell identifier; and
perform measurement on the second signal to generate a second measurement signal, and
the transmitter configured to transmit the second measurement signal to the serving base station.

9. The apparatus in claim 8, wherein the first signal and the second signal are sent on the same channel.

10. The apparatus in claim 9, wherein the same channel is a secondary synchronization channel.

11. The apparatus in claim 8, wherein the cell is associated with two different signature sequences, one corresponding to the first cell identifier and the other corresponding to the second cell identifier.

12. The apparatus in claim 11, wherein the cell identifier message indicates a time parameter from which one or more radio transceiver nodes can determine when to stop performing measurements on the first signal indicating the first cell identifier but continue performing measurements on the second signal indicating the second cell identifier.

13. The apparatus in claim 8, wherein the first and second cell identifiers are not necessarily unique within the cellular radio communications network.

14. A method implemented in a base station supporting a cell in a cellular radio communications network and serving radio transceivers associated with the cell, comprising:
transmitting a first signal that indicates a first cell identifier for identifying the cell;
receiving from one of the radio transceivers a first measurement signal indicating a measurement associated with the first signal that indicates the first cell identifier;
transmitting a cell identifier message indicating a second cell identifier for identifying the cell;
thereafter, transmitting both the first signal indicating the first cell identifier and a second signal indicating the second cell identifier; and
receiving from the one radio transceiver a second measurement signal indicating a measurement associated with the second signal that indicates the second cell identifier.

15. The method in claim 14, wherein the first signal and the second signal are transmitted on the same channel.

16. The method in claim 15, wherein the same channel is a secondary synchronization channel.

17. The method in claim 14, wherein the cell is associated with two different signature sequences, one corresponding to the first cell identifier and the other corresponding to the second cell identifier.

18. The method in claim 14, wherein the cell identifier message indicates a time parameter from which one or more radio transceiver nodes can determine when to stop performing measurements on the first signal indicating the first cell identifier but continue performing measurements on the second signal indicating the second cell identifier.

19. The method in claim 14, further comprising:
transmitting an instruction to the one radio transceiver to perform a handover to the second cell identifier.

20. The method in claim 14, wherein the first and second cell identifiers are not necessarily unique within the cellular radio communications network.

21. The method in claim 14, further comprising:
updating a neighbor cell list associated with the cell using the measurement reports received from the one or more radio transceivers.

22. Apparatus implemented in a base station supporting a cell in a cellular radio communications network and serving radio transceivers associated with the cell, comprising:
a radio transmitter configured to transmit a first signal that indicates a first cell identifier for identifying the cell;
a radio receiver configured to receive from one of the radio transceivers a first measurement signal indicating a measurement associated with the first signal that indicates the first cell identifier;
the transmitter configured to transmit a cell identifier message indicating a second cell identifier for identifying the cell, and thereafter, transmit both the first signal indicating the first cell identifier and a second signal indicating the second cell identifier; and
the receiver configured to receive from the one radio transceiver a second measurement signal indicating a measurement associated with the second signal that indicates the second cell identifier.

23. The apparatus in claim 22, wherein the first signal and the second signal are transmitted on the same channel.

24. The apparatus in claim 23, wherein the same channel is a secondary synchronization channel.

25. The apparatus in claim 22, wherein the cell is associated with two different signature sequences, one corresponding to the first cell identifier and the other corresponding to the second cell identifier.

26. The apparatus in claim 22, wherein the cell identifier message indicates a time parameter from which one or more radio transceiver nodes can determine when to stop performing measurements on the first signal indicating the first cell identifier but continue performing measurements on the second signal indicating the second cell identifier.

27. The apparatus in claim 22, wherein the transmitter is configured to transmit an instruction to the one radio transceiver to perform a handover to the second cell identifier.

28. The apparatus in claim 22, wherein the first and second cell identifiers are not necessarily unique within the cellular radio communications network.

29. The apparatus in claim 22, further comprising a data processor configured to update a neighbor cell list associated with the cell using the measurement reports received from the one or more radio transceivers.

* * * * *